Patented Nov. 14, 1944

2,362,475

UNITED STATES PATENT OFFICE 2,362,475

FUMIGANT

Fred W. Fletcher and Robert R. Dreisbach, Midland, Mich., assignors to The Dow Chemical Company, Midland, Mich., a corporation of Michigan No Drawing. Application June 1, 1942,
Serial No. 445,391

6 Claims. (Cl. 167—39)

The present invention relates to new and improved fumigants and fumigant mixtures and to a method for their use in controlling insect pests.

Many low boiling and volatile organic compounds have been suggested as fumigants, and carbon tetrachloride, methyl bromide, ethylene chloride, chloropicrin, and the like, are widely employed for the control of insect pests. These compounds vary considerably as to physical characteristics and a given toxicant may be limited in use to a particular type of fumigation procedure and the control of a specific insect.

Certain of the foregoing compounds in the amounts employed for fumigation are so lacking in odor as to necessitate mixing with lachrymators or other warning agents. Others have injurious effects upon many of the products ordinarily contacted with fumigant materials, or corrode metals. Still other fumigants cannot safely be employed for treating seeds without materially lowering their germinating properties.

With increased inventories of surplus grains, the control of weevils and related insect pests by fumigation has become of major importance. Similarly, the increased demand placed upon established transportation systems requires efficient and rapid fumigation procedures in order that pests may be eliminated from box cars and the like so as not to infest uncontaminated materials which may be carried thereby. To accomplish these ends, a fumigant is desired which will be both rapid and thorough in its action and not be subject to the disadvantages set forth above.

It is among the objects of the present invention to provide a new fumigant and fumigant mixtures which have lachrymatory properties so as to preclude the necessity of adding otherwise inert and potentially corrosive warning agents thereto. A further object is to provide such compositions which are more rapid in their action than are known fumigants. A further object is to supply fumigant compositions which will not have injurious effects upon wool, rubber, leather, feathers, fur, and the like, which will not be corrosive to metals, and which will not adversely affect the germination properties of seed which may be treated therewith. A still further object is to provide a method for the use of such compositions. Other objects of the invention will become apparent upon consideration of the following specification.

The present invention provides new fumigants which comprise methyl isopropenyl ketone as a major toxic ingredient. These fumigants are faster in action and effective against a wider assortment of insect pests than are many known fumigants and fumigant mixtures. In the amounts required for the control of insect pests, methyl isopropenyl ketone is a strong and persistent lachrymator, thus eliminating the necessity for incorporating warning agents therewith. The irritant property of very dilute concentrations of methyl isopropenyl ketone is such that human beings and higher animals can withstand it for very short periods only. Furthermore, this action appears to be cumulative and does not decrease by reason of fatigue of the affected organs. At the concentrations required, methyl isopropenyl ketone has no apparent injurious effect on wool, rubber, leather, etc., and does not corrode metals. A further desirable characteristic of this compound in fumigation procedures lies in the fact that it has no undesirable effect upon the germinating properties of seeds.

The invention contemplates the use in fumigation procedures of methyl isopropenyl ketone alone and also of mixtures of methyl isopropenyl ketone with other known fumigants. In such combination, the methyl isopropenyl ketone serves both as a warning agent and supplementary toxicant and the effectiveness of the mixture is frequently much greater than might be predicted from a knowledge of the toxicity of the constituents thereof. A preferred embodiment of this phase of the invention resides in a mixture of methyl isopropenyl ketone with methyl bromide and is being described and claimed in a concurrently filed application Serial No. 445,392. Other representative combinations include mixtures of methyl isopropenyl ketone with such halo-nitroalkanes as chloropicrin and 1,1-dichloro-1-nitroethane.

In operating according to the present invention, from about 0.25 to 1 pound or more of methyl isopropenyl ketone may be employed per 1000 cubic feet of space to be fumigated, the preferred amount depending upon the organism to be controlled, the temperature, the exposure time, and the general construction of the fumigation enclosure. When employed with other known fumigants, the proportion of methyl isopropenyl ketone varies from a small fraction of 1 per cent, when used essentially as a warning agent, to from about 5 to 95 per cent of the toxicant mixture where it is desired to take advantage of its parasiticidal action. The preferred amounts of such mixtures employed fall within the range of from 0.25 to 1 pound per 1000 cubic feet dependent upon the particular insect concerned, the nature of the fumigation enclosure, the temperature, and the time of exposure.

The fumigants herein described are adapted to be employed in any of the accepted fumigation procedures. For example, they may be employed in household fumigation for the control of such common pests as cockroaches, mice, bedbugs, spiders, etc. They also may be employed for the fumigation of box cars and other common carriers to control mites, weevils, roaches, beetles, grain borers, mice, and the like. Other uses to which the new fumigants are adapted include tent fumigation of growing trees and plants, greenhouse fumigation, the bin fumigation of grain, seed fumigation, etc.

The compound methyl isopropenyl ketone embodies unsaturation of a type leading to the formation of semi-solid or solid polymerization products. While this tendency is not always encountered to an objectionable degree, it is sometimes desirable to incorporate into the liquid methyl isopropenyl ketone prior to vaporization in the fumigation operation a small proportion of a phenol and particularly of a polyhydroxy phenol such as hydroquinone, etc. The amount of such phenol employed is that required to serve as a stabilizer and is generally between about 0.001 and 0.1 per cent by weight. In the examples of the present application the methyl isopropenyl ketone employed was modified with 0.01 per cent by weight of hydroquinone in order that inconsistencies resulting from the presence of traces of polymer might be avoided.

The following examples illustrate the invention as regards the toxicity of the described compositions, their mode of application, the particular insects controlled thereby, and the effect of the recommended treatment upon materials commonly subjected to fumigation. The invention is to be in no way limited thereby.

Example 1

Methyl isopropenyl ketone was tested against a number of insect pests according to standard fumigation procedures at a constant temperature of approximately 25° C., and a relative humidity of 55 per cent ± 5 per cent. The following results are representative:

Table I

| Insect name | Life stage | Per cent mortality | | | |
|---|---|---|---|---|---|
| | | 5 hrs. exposure | | 16 hrs. exposure | |
| | | 0.55 #/1,000 cu. ft. | 0.75 #/1,000 cu. ft. | 0.3 #/1,000 cu. ft. | 0.5 #/1,000 cu. ft. |
| Bedbug | Adults and nymphs | 100 | 100 | 100 | 100 |
| Rice weevil | Adults | 100 | 100 | 100 | 100 |
| Pea weevil | do | 100 | 100 | 100 | 100 |
| American cockroach | Adults and nymphs | 96 | 100 | 90 | 100 |
| German cockroach | do | 100 | 100 | 100 | 100 |
| Large milkweed bug | Adults | 100 | 100 | 100 | 100 |
| Milkweed bug | Eggs | 100 | 100 | 100 | 100 |
| Cynaeus angustus | Adults | 80 | 100 | 100 | 100 |
| Med. flour moth | Larvae | 100 | 100 | 100 | 100 |
| Lesser grain borer | Adults | 100 | 100 | 100 | 100 |
| Confused flour beetle (Tribolium confusum) | do | 100 | 100 | 100 | 100 |

Example 2

In comparative determinations, methyl isopropenyl ketone was compared with such well known and accepted fumigant materials as chloropicrin, methyl bromide, "Ethide" (1.1-dichloro-1-nitroethane) and "Tritox" (trichloroacetonitrile). The amount of each toxicant required to give a 50 per cent kill (expressed as median lethal dose or M. L. D.) and the lowest concentration required to give 100 per cent mortality against Tribolium confusum was determined under the conditions described in Example 1. The following table sets forth the results as obtained.

Table II

| Fumigant | Concentration in #/1,000 cu. ft. | |
|---|---|---|
| | M. L. D. 5 hrs. exposure | 100% mortality 5 hrs. exposure |
| Chloropicrin | 0.4 | 0.7 |
| Methyl isopropenyl ketone | Less than 0.4 | 0.55 |
| Methyl bromide | 0.55–0.6 | 0.65 |
| "Ethide"-1,1-dichloro-1-nitroethane | 0.6–0.7 | 0.8 |
| "Tritox"-trichloro-acetonitrile | 0.55 | 1.0 |

Example 3

Tribolium confusum was employed as a test insect to determine the effectiveness of mixtures of methyl isopropenyl ketone and 1,1-dichloro-1-nitroethane in the standard fumigation procedure as described in the foregoing examples. 0.4 pound per 1000 cubic feet of a 50–50 mixture by weight of these two fumigants gave a kill of 95 per cent against the test insects in 5 hours' exposure. At 0.2 pound per 1000 cubic feet, neither the methyl isopropenyl ketone nor the 1,1-dichloro-1-nitroethane killed any of the insects whatever.

Example 4

In a similar determination, a 50 per cent by weight mixture of methyl isopropenyl ketone and chloropicrin was employed at a concentration of 0.4 pound per 1000 cubic feet. This mixture gave a kill against Tribolium confusum of 93 per cent in 5 hours' exposure. Chloropicrin at 0.2 pound per 1000 cubic feet gave no kill against the test insects.

Example 5

To determine the effect of methyl isopropenyl ketone on materials commonly contacted with fumigants a number of organic products and metals were exposed to the compound in the amount of 1 pound per 1000 cubic feet over a period of 24 hours at 25° C. The following table sets forth the results obtained.

Table III

| Materials fumigated | Observed result |
|---|---|
| Wool cloth | No objectionable residual odor. |
| Rubber | Do. |
| Fur | Do. |
| Leather | Do. |
| Feathers | Do. |
| Prunes | No objectionable odor or taste. |
| Silver foil | No corrosion effects. |
| Galvanized iron (zinc) | Do. |
| Iron | Do. |
| Copper | Do. |
| Brass | Do. |

EXAMPLE 6

In a similar manner seeds were fumigated with methyl isopropenyl ketone as described in Example 5 to determine the effect upon germination. The following table sets forth the results obtained in accordance with a standard germination procedure carried out upon both treated and untreated seeds.

Table IV

| Name of seed | Treatment | Per cent germination |
|---|---|---|
| Clover | Fumigated with methyl isopropenyl ketone, 1#/1,000 cu. ft. | 79 |
| Do | Check | 81 |
| Stringless greenpod beans. | Fumigated with methyl isopropenyl ketone, 1#/1,000 cu. ft. | 71 |
| Do | Check | 68 |
| Timothy | Fumigated with methyl isopropenyl ketone 1#/1,000 cu. ft. | 95 |
| Do | Check | 96 |
| Pioneer hybrid seed corn #307LF. | Fumigated with methyl isopropenyl ketone, 1#/1,000 cu. ft. | 100 |
| Do | Check | 97 |

While the foregoing examples describe the use of methyl isopropenyl ketone and combinations thereof with certain halo-nitro-alkanes, it is to be understood other addition agents may be incorporated into the fumigant mixtures as described. Thus, methyl isopropenyl ketone alone or in combination with a halo-nitro-alkane may be dissolved or otherwise incorporated into less volatile carriers to obtain compositions adapted to be sprayed or otherwise applied to materials infested with insect pests. In such compositions the active toxic principle is given up gradually over a period of time. Representative of the carriers which may be so employed are light petroleum distillates, white oils, ethylene chloride, carbon tetrachloride, propylene chloride, liquid halo-benzenes, hydrogenated naphthalene, etc.

We claim:

1. A method for controlling insects and related parasites comprising the step of exposing such organisms to the vapor of a fumigant composition comprising monomeric methyl isopropenyl ketone as a major toxic ingredient.

2. A fumigant composition comprising a mixture of monomeric methyl isopropenyl ketone and chloropicrin.

3. A fumigant composition comprising a mixture of monomeric methyl isopropenyl ketone and 1.1-dichloro-1-nitroethane.

4. A fumigant mixture comprising from 5 to 95 per cent by weight of monomeric methyl isopropenyl ketone in mixture with a halo-nitro-alkane.

5. A fumigant mixture comprising monomeric methyl isopropenyl ketone and a halo-nitro-alkane.

6. A fumigant mixture comprising monomeric methyl isopropenyl ketone and a stabilizing amount of hydroquinone.

FRED W. FLETCHER.
ROBERT R. DREISBACH.